United States Patent [19]

Kakuishi et al.

[11] Patent Number: 4,761,243

[45] Date of Patent: Aug. 2, 1988

[54] PROCESS FOR THE PREPARATION OF MAGNETIC PAINT

[75] Inventors: Yutaka Kakuishi; Kenichi Masuyama; Masaaki Fujiyama; Toshimitu Okutu, all of Odawara, Japan

[73] Assignee: Fuji Photo Film Co., Ltd., Kanagawa, Japan

[21] Appl. No.: 943,211

[22] Filed: Dec. 8, 1986

[30] Foreign Application Priority Data

Dec. 7, 1985 [JP] Japan ................. 60-275508

[51] Int. Cl.$^4$ ................. C04B 35/04; H01F 1/00; H01F 1/26
[52] U.S. Cl. ................. 252/62.54; 252/62.56; 523/351
[58] Field of Search ................. 252/62.54, 62.56; 523/351

[56] References Cited

U.S. PATENT DOCUMENTS

| | | | |
|---|---|---|---|
| 4,492,734 | 1/1985 | Ogawa et al. | 252/62.54 |
| 4,503,120 | 3/1985 | Yamauchi et al. | 252/62.54 |
| 4,526,837 | 7/1985 | Ohtsuki et al. | 252/62.54 |
| 4,632,868 | 12/1986 | Miyoshi et al. | 252/62.54 |

FOREIGN PATENT DOCUMENTS

| | | | |
|---|---|---|---|
| 0148726 | 11/1981 | Japan | 252/62.54 |
| 0167772 | 12/1981 | Japan | 252/62.54 |

Primary Examiner—John C. Bleutge
Assistant Examiner—R. Dean, Jr.
Attorney, Agent, or Firm—Sughrue, Mion, Zinn, Macpeak & Seas

[57] ABSTRACT

A process for the preparation of a magnetic paint comprising a ferromagnetic powder, an abrasive and a binder, which comprises the steps of preparing the abrasive dispersion comprising the abrasive and the binder, and then mixing said abrasive dispersion and the ferromagnetic powder.

7 Claims, No Drawings

PROCESS FOR THE PREPARATION OF MAGNETIC PAINT

BACKGROUND OF THE INVENTION

1. Field of the Invention

The present invention relates to a process for the preparation of a magnetic paint, and more particularly to a process for the preparation of a magnetic paint employed for the formation of a magnetic recording layer of a magnetic recording medium.

2. Description of Prior Arts

A magnetic recording medium comprising a nonmagnetic support and a magnetic recording layer provided thereon is used as an audio tape, a video tape, or a recording medium for a computer system. The magnetic recording layer of the magnetic recording medium is formed on a support by coating a magnetic paint containing a binder, a ferromagnetic powder and other additives dispersed in a solvent on the support, and drying the coated layer. For the improvement of the running endurance of a magnetic recording medium, there has been widely employed a powder of high hardness (i.e., abrasive) such as $\alpha\text{-}Al_2O_3$ by incorporating it into the magnetic recording layer.

The magnetic paint employable for a magnetic recording layer is generally prepared by dispersing in a solvent various components for the formation of a magnetic recording layer of a recording medium, such as ferromagnetic powder, a binder and an abrasive. That is, in the conventional process for the preparation of a magnetic paint, a ferromagnetic powder and an abrasive are simultaneously dispersed in a solvent.

The present inventors have found that the dispersibility of the abrasive varies depending upon the kind of a binder employed, and the abrasive has a poor dispersibility in the binder comprising a vinyl chloride type copolymer and a urethane resin, particularly in the polyurethane resin. The binder comprising both the vinyl chloride type copolymer and the polyurethane resin having been widely used for improving the running endurance of the resulting recording medium.

Accordingly, if a magnetic paint is prepared by the conventional process comprising simultaneously dispersing the binder, abrasive and ferromagnetic paint in a solvent, the resulting dispersion for a magnetic paint generally contains not a small amount of agglomerates of the abrasive. Such dispersion containing not a small amount of the abrasive agglomerates causes lowering of filtration efficiency when the dispersion is subjected to a filtration step.

Further, some abrasives in the agglomerated state which are not removed by the filtration are introduced into the resulting magnetic recording layer in the same state. The agglomerated particles of the abrasive are liable to drop off from the recording layer, so that the phenomenon of so-called drop-out of reproduction signals occurs because of dropping of the abrasive from the magnetic recording medium.

For preventing the production of abrasive agglomerates in the magnetic paint, it can be employed that the period for dispersing procedure is lengthened whereby enhancing the dispersibility of the abrasive. However, in that case, the ferromagnetic powder in the dispersion is apt not only to be damaged owing to contact with the abrasive so as not to improve the electromagnetic conversion characteristics of the resulting recording medium, but also to become in the exceedingly dispersed state because of the long dispersing time so as to cause reagglomeration of the powder in the magnetic paint.

Japanese Patent Provision Publication No. 56(1981)-167769 describes that the dispersing process is divided into two stages of the first dispersing stage and the second dispersing stage, and the dispersing procedure is performed by mixing a ferromagnetic powder with a portion of a binder in a solvent in the first dispersing stage to prepare a dispersion and further mixing an abrasive and a residual portion of the binder with the dispersion in the second dispersing stage. If a magnetic paint is prepared according to the above-mentioned process, there is given an advantage that the ferromagnetic powder is hardly damaged by contact with an abrasive, because the ferromagnetic powder is brought into contact with the abrasive under condition covered with the binder. However, any improvement cannot be obtained with respect to the dispersibility of an abrasive even by the process described above.

SUMMARY OF THE INVENTION

It is the first object of the present invention to provide a novel process for the preparation of a magnetic paint for the formation of a magnetic recording layer of a magnetic recording medium.

It is the second object of the invention to provide a process for the preparation of a magnetic paint capable of preparing a magnetic recording medium which has a high running endurance.

It is the third object of the invention to provide a process for the preparation of a magnetic paint capable of preparing a magnetic recording medium which has high electromagnetic conversion characteristics.

It is the fourth object of the invention to provide a process for the preparation of a magnetic paint containing a reduced amount of agglomerates and having a high filtration efficiency when the magnetic paint is prepared by a process involving a filtration procedure.

There is provided by the present invention a process for the preparation of a magnetic paint comprising a ferromagnetic powder, an abrasive and a binder, which comprises the steps of preparing an abrasive dispersion comprising the abrasive with the binder, and then mixing said abrasive dispersion with the ferromagnetic powder.

According to the process of the present invention, the abrasive is very well dispersed in a magnetic paint to less produce agglomerates of the abrasive in the magnetic paint, and hence a magnetic recording layer of a recording medium formed utilizing the magnetic paint is improved in the running endurance and electromagnetic conversion characteristics.

The process of the preparation of a magnetic paint of the present invention is accomplished based on the discovery that an abrasive is insufficiently dispersed in a magnetic paint in the case that the dispersibility of the abrasive is lower than that of the ferromagnetic powder and hence the ferromagnetic powder is well dispersed, while the ferromagnetic powder is exceedingly dispersed to cause lowering of the dispersibility thereof under such condition that the abrasive is well dispersed.

In the process of the present invention, a magnetic paint in which an abrasive is well dispersed can be easily obtained by first preparing an abrasive dispersion. By the process involving the pre-dispersing the abrasive, not only dispersibility of the ferromagnetic power is not reduced, but also occurrence of damages of the ferromagnetic powder caused by contact with the abrasive can be prominently reduced.

Accordingly, in a magnetic recording medium having a magnetic recording layer prepared using the magnetic paint of the invention, the abrasive less drops off from the recording layer because the agglomerates of the abrasive are less produced in the magetic layer, whereby the running endurance of the medium is improved. Further, in the case of a video tape, occurrence of drop-out caused by dropping the abrasive from the recording layer can be reduced to improve the electromagnetic conversion characteristics.

In the preparation of a magnetic paint, a dispersion containing the components for the formation of a magnetic recording layer is generally subjected to filtration. In this case (i.e., the case of subjecting the dispersion to filtration), filtration efficiency can be enhanced in the process of the invention, because the agglomerates of the abrasive are less produced and the ferromagnetic powder is well dispersed in the magnetic paint.

DETAILED DESCRIPTION OF THE INVENTION

The process for the preparation of a magnetic paint of the present invention is based on the discovery on the difference of dispersibility between an abrasive and a binder as described hereinbefore. That is, the process of the invention is characterized in that the process comprises the steps of dispersing an abrasive having a lower dispersibility than a ferromagnetic powder with a binder in a solvent to prepare an abrasive dispersion (dispersion comprising an abrasive and a binder in a solvent), and then mixing the abrasive dispersion with the ferromagnetic powder (which is introduced in the form of a powder or in the form of a dispersion in a solvent) in a solvent.

Components for the formation of a magnetic recording layer employable in the process of the invention can be selected from those generally employed for the formation of a magnetic recording layer.

The binder can be selected from those conventionally employed. Examples of the binder include vinyl chloride type copolymers, cellulose derivatives such as nitrocellulose, acrylic resin, polyvinyl acetal resin, polyvinyl butyral resin, epoxy resin, phenoxy resin, and polyurethane resins such as polyester-polyurethane resin, polyether-polyurethane resin and polycarbonate-polyurethane resin.

A vinyl chloride type copolymer generally contains other repeating unit than vinyl chloride. Examples of the repeating unit include vinyl ether such as methyl vinyl ether, isobutyl ether and lauryl vinyl ether; $\alpha$-monoolefin such as ethylene and propylene; acrylic acid ester; (meth)acrylonitrile; aromatic vinyl such as styrene and $\alpha$-methylstyrene; and vinyl ester such as vinyl acetate and vinyl propionate. The vinyl chloride type copolymer may be incorporated with a functional group such as —OH, —$SO_3M$, —COOM and —PO(OM')$_2$, in which M is hydrogen or an alkali metal atom; and M' is hydrogen, an alkali metal atom or a lower hydrocarbon group.

It is particularly preferred to employ a combination of the above-mentioned vinyl chloride type copolymer and a polyurethane resin as a binder.

The binder is contained in the magnetic paint generally in an amount of 10–100 parts by weight, preferably 20–40 parts by weight, based on 100 parts by weight of the ferromagnetic powder.

The above-mentioned binder is preferably employed in combination with a polyisocyanate compound.

The abrasive employable in the invention can be selected from those generally employed for the preparation of a magnetic recording layer of a magnetic recording medium. Examples of the abrasive include $\alpha$-$Al_2O_3$, $\gamma$-$Al_2O_3$, $Cr_2O_3$, $SnO_2$, $SiO_2$, $TiO_2$, $\alpha$-$Fe_2O_3$ and $Fe_3O_4$. These abrasives can be employed singly or in combination. Preferably employed is an abrasive comprising $\alpha$-$Al_2O_3$ having a high hardness. A mean diameter of the abrasive is generally in the range of 0.01–0.6 $\mu$m. The abrasive is contained in the magnetic paint generally in an amount of 1–20 parts by weight, preferably 5–15 parts by weight, based on 100 parts by weight of the ferromagnetic powder contained in the magnetic recording layer.

The ferromagnetic powder employable in the invention can be also selected from those conventionally employed. Examples of the ferromagnetic powder include a metal oxide-type ferromagnetic powder such as $\gamma$-$Fe_2O_3$, a modified metal oxide-type ferromagnetic powder containing other component such as Co-containing $\gamma$-$Fe_2O_3$, and a ferromagnetic metal powder containing iron, cobalt or nickel.

It is particularly advantageous to utilize the process of the present invention for the preparation of a magnetic paint using a ferromagnetic metal powder having a specific surface area (S-BET) of not less than 42 $m^2/g$, preferably 45 $m^2/g$, among the above-described ferromagnetic metal powders, because the ferromagnetic powder having such S-BET value is very low in hardness and hence is liable to be easily damaged by the contact with the abrasive in the conventional process.

As a typical ferromagnetic metal powder, there can be mentioned a ferromagnetic alloy powder containing a metal component of at least 75 wt.% in which at least 80 wt.% of the metal component comprises at least one ferromagnetic metal or metal alloy (e.g., Fe, Co, Ni, Fe-Co, Fe-Ni, Co-Ni, Fe-Zn-Ni, or Co-Ni-Fe) and the remaining metal component, if present, comprises other atom(s) (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B or P). The ferromagnetic metal component may contain a small amount of water, hydroxide, or oxide. Processes for the preparation of those ferromagnetic metal powders are already known, and the ferromagnetic metal powder employed in the invention can be prepared by the known processes.

There is no specific limitation on the shape of the ferromagnetic metal powder employable in the invention, but generally used is a ferromagnetic powder in needle shape, grain shape, dice shape, rice shape or plate shape. The present invention is advantageously employed in the preparation of a magnetic paint using a ferromagnetic metal powder in a needle shape.

In addition to the above-mentioned abrasive, binder and ferromagnetic powder, there can be employed various additives for the conventional magnetic recording layer such as a lubricant (e.g., fatty acid and fatty acid ester), an antistatic agent (e.g., carbon black), a filler and a dispersing agent.

The magnetic paint is a dispersion comprising the above-described components for the formation of a magnetic recording layer in a solvent. The solvent can be selected from those generally employed in the preparation of a magnetic paint.

Examples of the solvent include ketones such as methyl ethyl ketone, cyclohexanone, diethyl ketone, methyl isobutyl ketone and acetone, ethers such as diethyl ether, methyl ethyl ether and dioxane, esters such as ethyl acetate and butyl acetate, aromatic group solvent such as toluene and xylene, and alcohols such as methanol, ethanol, propanol and butanol. These solvents con be employed singly or in combination.

The solvent is generally contained in the magnetic paint in an amount of 30–500 parts by weight based on 100 parts by weight of the ferromagnetic powder.

In the process for the preparation of a magnetic paint according to the present invention, an abrasive dispersion containing an abrasive and a binder in a solvent is initially prepared.

It has been confirmed that an abrasive has a poor dispersibility, particularly for the specific resin such as a polyurethane resin, as compared with a ferromagnetic powder. Therefore, by initially dispersing the abrasive in a solvent prior to incorporating the ferromagnetic powder, any disadvantage is not given to other component (for instance, disadvantage that the ferromagnetic powder is exceedingly dispersed by lengthening the period of the dispersing procedure), and almost all particles of the abrasive can be dispersed in the form of a primary particle.

The binder may be incorporated into the abrasive dispersion in the whole amount or in a partial amount. For instance, in the case that both of the aforementioned vinyl chloride type copolymer and polyurethane resin are employed as a binder and a portion of them is employed for the preparation of the abrasive dispersion, the polyvinyl chloride type copolymer having a relatively high dispersibility for the abrasive is preferably empolyoed for the preparation of the abrasive dispersion.

However, there is no requirement to employ the vinyl chloride type copolymer singly, and a mixture of the vinyl chloride type copolymer and the polyurethane resin can be also employed.

There is no specific limitation on the ratio between the binder and the abrasive in the abrasive dispersion, provided that the ratio therebetween in the resulting magnetic paint obtained through the subsequent step of the invention is adjusted to be in the aforementioned favorable range in any stage of the process of the invention, and the ratio therebetween can be appropriately determined under the consideration of the dispersibility of the abrasive, etc.

The amount of the solvent contained in the abrasive dispersion comprising the binder and the abrasive is appropriately determined under the consideration of the nature, amount, etc. of the abrasive and binder, and generally ranges from 50 to 500 parts by weight based on 100 parts by weight of the abrasive.

The abrasive and the binder can be dispersed in the solvent according to the conventional dispersing method. Examples of the dispersing apparatus employable in the invention include a ball mill, a homomixer, a sand mill, a sand grinder, a pebble mill, a tron mill, a Szegvari attritor, a high-speed stone mill, a high-speed impact mill, a high-speed mixer and a homogenizer.

The period for the dispersing procedure is determined depending upon the kind of the employed dispersing apparatus, abrasive, binder, etc., and generally ranges from 1 to 60 hours.

The obtained abrasive dispersion is then filtered to remove the agglomerates contained in the dispersion in a small amount, whereby a magnetic paint for preparing a magnetic recording medium further improved in various properties can be obtained.

In the abrasive dispersion prepared as above, almost all particles of the abrasive are dispersed in the form of primary particles or particles of similar size, and the binder is dissolved or dispersed in the dispersion.

Subsequently, the abrasive dispersion is mixed with the aforementioned ferromagnetic powder.

When the abrasive dispersion contains the whole amount of the binder, the ferromagnetic powder is added into the abrasive dispersion in the form of powder or in the dispersed form in a solvent, and they are mixed.

When the abrasive dispersion contains a portion of the binder, the residual portion of the binder and the ferromagnetic powder are dispersed in a solvent to prepare a ferromagnetic powder dispersion (dispersion comprising a ferromagnetic powder), and the ferromagnetic powder dispersion and the abrasive dispersion are mixed with each other. For instance, in the case that both of the vinyl chloride type copolymer and the polyurethane resin are employed and the abrasive dispersion contains a portion of the vinyl chloride type copolymer as described hereinbefore, a ferromagnetic powder, a polyurethane resin and the residual portion of the vinyl chloride type copolymer are dispersed in a solvent to prepare a ferromagnetic powder dispersion, and the ferromagnetic powder dispersion and the abrasive dispersion are mixed with each other.

Alternatively, the abrasive dispersion previously prepared as described hereinbefore can be added in the dispersing procedure of the ferromagnetic powder and the residual portion of the binder.

The mixing time (or mixing and dispersing time) for the formation of the ferromagnetic powder dispersion can be appropriately determined under the consideration of the kind, S-BET, etc., of the ferromagnetic powder employed, and generally ranges from 1 to 40 hours. The mixing time is generally shorter than that required for preparing the above-mentioned abrasive dispersion, because the dispersibility of the ferromagnetic powder is higher than that of the abrasive.

In the mixing procedure, the amounts of both dispersions (i.e., abrasive dispersion and ferromagnetic powder dispersion) are adjusted in such a manner that the amount of each component would be in the ratio of the favorable range as a magnetic paint.

If other components than the abrasive and ferromagnetic powder (e.g., a lubricant such as fatty acid or fatty acid ester, an antistatic agent such as carbon black, a filler, and a dispersing agent) are employed for the formation of a magnetic recording layer, those components may be incorporated into any one of the abrasive dispersion and the ferromagnetic powder dispersion. Alternatively, other procedure for adding those components can be incorporated into the process of the invention independently of the procedures for preparing the abrasive dispersion and the ferromagnetic powder dispersion.

The mixture of both dispersions (i.e., abrasive dispersion and ferromagnetic powder dispersion) prepared as above can be coated as a magnetic paint over a support. However, the mixture is generally filtered by the use of a filter in advance of the coating, for example, a filter having a mean pore diameter of 0.5–1.5 $\mu$m, and thus filtered mixture is then employed as a magnetic paint for the preparation of a magnetic recording medium.

In the process for preparation of a magnetic paint according to the invention, the abrasive is dispersed in the absence of a ferromagnetic powder, and hence the abrasive is very well dispersed in the obtained abrasive dispersion. Further, since the abrasive is present in the abrasive dispersion in the covered state on its surface with the binder, the surface of the abrasive is not brought into direct contact with the ferromagnetic powder in the mixing procedure with the ferromagnetic powder, whereby the ferromagnetic powder is effectively prevented from damages.

In addition to the above-mentioned advantages, the exceedingly dispersed state is not produced in the ferromagnetic powder even if the abrasive is dispersed over a long period of time, because the dispersing procedure for the abrasive dispersion is carried out in the absence of the ferromagnetic powder.

The magnetic paint prepared as described above is coated over the support to form a layer of the magnetic paint, and the layer of the magnetic paint is then subjected to conventional processes for the preparation of a magnetic recording medium such as a magnetic orientation, a drying process and a surface smoothening process, to form a magnetic recording layer.

The examples and the comparison examples of the present invention are given below. In the following examples, the expression "part(s)" means "part(s) by weight", otherwise specified.

EXAMPLE 1

The components for an abrasive dispersion indicated below were kneaded in a kneader, and the mixture was dispersed in a ball mill for 18 hours to give an abrasive dispersion.

| | |
|---|---|
| α-Al$_2$O$_3$ (mean particle size: 0.5 μm) | 100 parts |
| Vinyl chloride/vinyl acetate/maleic anhydride copolymer (400 × 100 A, polymerization degree: 400, available from Nippon Geon Co., Ltd., Japan) | 20 parts |
| Methyl ethyl ketone | 100 parts |

Independently, the components for a ferromagnetic powder dispersion indicated below were kneaded in a kneader, and the mixture was dispersed in a ball mill for 12 hours to give a ferromagnetic powder dispersion.

| | |
|---|---|
| Ferromagnetic metal alloy powder (Fe—Ni alloy, specific surface area: 50 m$^2$/g) | 100 parts |
| Vinyl chloride/vinyl acetate/maleic anhydride copolymer (the same as described above) | 12 parts |
| Polyurethane resin (N-2301, available from Nippon Polyurethane Co., Ltd., Japan) | 12 parts |
| Carbon black (mean particle size: 0.04 μm) | 1 part |
| Methyl ethyl ketone | 295 parts |

To a mixture of 22 parts of the abrasive dispersion and 420 parts of the ferromagnetic powder dispersion was added 38 parts of a solution containing 8 parts of a polyisocyanate compound (Colonate L: trade name of Nippon Polyurethane Co., Ltd.), 5 parts of stearic acid and 5 parts of butyl stearate dissolved in 20 parts of methyl ethyl ketone, and they were mixed. The mixture was then filtered over a filter having a mean pore size of 1 μm to give a magnetic paint.

The obtained magnetic paint was coated over a polyethylene terephthalate support (thickness: 10 μm) to give a coated layer having thickness of 3.0 μm (thickness in dry state). The support with the coated layer was subjected to a magnetic orientation and supercalendering. The resulting sheet was slit into width of 8 mm to prepare an 8 mm type video tape.

The obtained video tape was measured on the S/N ratio and the number of drop-out by the use of a commercially available video tape recorder (FUJIX-8, trade name of Fuji Photo Film Co., Ltd.).

The results are set forth in Table 1, in which a filter life in the above-described filtration procedure is also set forth.

In the following examples and comparison examples, the S/N ratio and the number of drop-out were measured according to the same manner as described above, and the expression "filter life" means the time in which a filter is able to be used.

The components for the formation of a magnetic recording layer used in the following examples and comparison examples were the same as those used in the above-mentioned example.

EXAMPLE 2

The procedure for the preparation of the abrasive dispersion of Example 1 was repeated except for using the components for an abrasive dispersion indicated below to prepare an abrasive dispersion.

| | |
|---|---|
| α-Al$_2$O$_3$ | 10 parts |
| Vinyl chloride/vinyl acetate/maleic anhydride copolymer | 14 parts |
| Polyurethane resin | 12 parts |
| Carbon black | 1 part |
| Methyl ethyl ketone | 305 parts |

The procedure of Example 1 was repeated except for incorporating 100 parts of the ferromagnetic powder of Example 1 into the obtained abrasive dispersion and dispersing the resulting mixture for 12 hours, to prepare a magnetic paint. Using the obtained magnetic paint, a magnetic recording medium was produced in the same manner as described in Example 1.

The magnetic recording medium was measured on the S/N ratio, the number of drop-out and the filter life. The results are set forth in Table 1.

EXAMPLE 3

An abrasive dispersion having the same composition as that of Example 1 was prepared in the same manner as described in Example 1. The obtained abrasive dispersion was used for the preparation of a magnetic paint as indicated below.

The procedure for the preparation of the ferromagnetic powder dispersion of Example 1 was repeated except for using the components for a magnetic paint indicated below, to prepare a dispersion for a magnetic paint.

| | |
|---|---|
| Ferromagnetic metal powder | 100 parts |
| Vinyl chloride/vinyl acetate/maleic anhydride copolymer | 12 parts |
| Polyurethane resin | 12 parts |
| Carbon black | 1 part |
| Methyl ethyl ketone | 295 parts |
| Abrasive dispersion | 22 parts |

The obtained dispersion for a magnetic paint was filtered in the same manner as described in Example 1 to prepare a magnetic paint. Using the magnetic paint, a magnetic recording medium was produced in the same manner as described in Example 1.

The magnetic recording medium was measured on the S/N ratio, the number of drop-out and the filter life. The results are set forth in Table 1.

COMPARISON EXAMPLE 1

The procedure of Example 3 was repeated except for using the components for a magnetic paint indicated below and dispersing the resulting mixture for 12 hours, to prepare a magnetic paint.

| | |
|---|---|
| Ferromagnetic metal powder | 100 parts |
| $\alpha$-Al$_2$O$_3$ | 10 parts |
| Vinyl chloride/vinyl acetate/maleic anhydride copolymer | 14 parts |
| Polyurethane resin | 12 parts |
| Carbon black | 1 part |
| Methyl ethyl ketone | 305 parts |

Using the obtained magnetic paint, a magnetic recording medium was produced in the same manner as described in Example 1.

The magnetic recording medium was measured on the S/N ratio, the number of drop-out and the filter life. The results are set forth in Table 1.

COMPARISON EXAMPLE 2

The procedure of Comparison Example 1 was repeated except for dispersing the resulting mixture for 18 hours, to prepare a magnetic paint. Using the magnetic paint, a magnetic recording medium was produced in the same manner as described in Example 1.

The magnetic recording medium was measured on the S/N ratio, the number of drop-out and the filter life. The results are set forth in Table 1.

TABLE 1

| | S/N Ratio (dB) | Drop-out (number/ min.) | Filter Life |
|---|---|---|---|
| Example 1 | +2 | 5 | not shorter than 20 hrs. |
| Example 2 | +2 | 5 | not shorter than 20 hrs. |
| Example 3 | +2 | 5 | not shorter than 20 hrs. |
| Com. Example 1 | ±0 | 70 | 4 hrs. |
| Com. Example 2 | −5 | 50 | 10 hrs. |

We claim:

1. A process for the preparation of a magnetic paint comprising a ferromagnetic powder, an abrasive, a binder and a solvent, which comprises the steps of preparing an abrasive dispersion comprising the abrasive and the binder in the solvent, and then mixing said abrasive dispersion with the ferromagnetic powder, wherein said abrasive is selected from the group consisting of $\alpha$-Al$_2$O$_3$, $\gamma$-Al$_2$O$_3$, Cr$_2$O$_3$, SnO$_2$, SiO$_2$, TiO$_2$, $\alpha$-Fe$_2$O$_3$ and Fe$_3$O$_4$.

2. A process for the preparation of a magnetic paint comprising a ferromagnetic powder, an abrasive, a binder and a solvent, which comprises the steps of preparing a ferromagnetic powder dispersion comprising the ferromagnetic powder and the binder in the solvent, and then mixing said ferromagnetic powder dispersion with an abrasive dispersion comprising the abrasive and the binder in the solvent, wherein said abrasive is selected from the group consisting of $\alpha$-Al$_2$O$_3$, $\gamma$-Al$_2$O$_3$, Cr$_2$O$_3$, SnO$_2$, SiO$_2$, TiO$_2$, $\alpha$-Fe$_2$O$_3$ and Fe$_3$O$_4$.

3. The process as claimed in claim 1, wherein said binder contained in the abrasive dispersion is a vinyl chloride copolymer.

4. The process as claimed in claim 1, wherein said abrasive contains $\alpha$-Al$_2$O$_3$.

5. The process as claimed in claim 1, wherein said binder comprises a vinyl chloride copolymer and a polyurethane resin.

6. The process as claimed in claim 1, wherein said ferromagnetic powder is a ferromagnetic metal powder having a specific surface area of not less than 42 m$^2$/g.

7. The process as claimed in claim 1, wherein said binder is a copolymer of vinyl chloride and another compound selected from the group consisting of a vinyl ether, an $\alpha$-monoolefin, an acrylic acid ester, an acrylonitrile, a methacrylonitrile, an aromatic vinyl compound and a vinyl ester.

* * * * *